G. U. MULLER.

AUTOMATIC STABILIZING APPARATUS FOR AEROPLANES.

APPLICATION FILED SEPT. 27, 1911.

1,032,852.

Patented July 16, 1912.

3 SHEETS—SHEET 1.

WITNESSES

H. G. Dieterich

P. F. Nagle.

INVENTOR

Gottlieb U. Muller

BY

Wiedersheim & Fairbanks

ATTORNEYS

G. U. MULLER.

AUTOMATIC STABILIZING APPARATUS FOR AEROPLANES.

APPLICATION FILED SEPT. 27, 1911.

1,032,852. Patented July 16, 1912.

3 SHEETS—SHEET 2.

WITNESSES

H. G. Dieterich

P. F. Nagle

INVENTOR

Gottlieb U. Muller.

BY

Wiedersheim & Fairbanks

ATTORNEYS

G. U. MULLER.

AUTOMATIC STABILIZING APPARATUS FOR AEROPLANES.

APPLICATION FILED SEPT. 27, 1911.

1,032,852. Patented July 16, 1912.

3 SHEETS—SHEET 3.

WITNESSES

H. G. Dieterich

P. F. Nagle.

INVENTOR

Gottlieb U. Muller.

BY

Wiedersheim & Fairbanks

ATTORNEYS

UNITED STATES PATENT OFFICE.

GOTTLIEB U. MULLER, OF PHILADELPHIA, PENNSYLVANIA.

AUTOMATIC STABILIZING APPARATUS FOR AEROPLANES.

1,032,852. Specification of Letters Patent. Patented July 16, 1912.

Application filed September 27, 1911. Serial No. 651,503.

*To all whom it may concern:*

Be it known that I, Gottlieb U. Muller, a citizen of the United States, residing in the city and county of Philadelphia, State of Pennsylvania, have invented a new and useful Automatic Stabilizing Apparatus for Aeroplanes, of which the following is a specification.

This invention relates to aeroplane mechanisms and more particularly to a device for automatically operating the stabilizing planes of an aeroplane whereby the machine is returned to normal level position without any attention on the part of the operator.

It has for an object to provide a stabilizing device which is sensitive, accurate and dependable and whereby the effect of sudden currents of air, eddies and the like are overcome in a positive manner and the danger of the plane being overturned is eliminated.

As heretofore constructed the stabilizing planes have been controlled entirely by the operator of the machine and it has therefore been necessary to divide attention between the manipulating of these planes, controlling the motor and steering.

By my present invention the operator is relieved of the care of the balancing or stabilizing planes, which are automatically adjusted to return the machine to normal level position and consequently the operator may give entire attention to other details of managing the machine.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figures 1, 2:
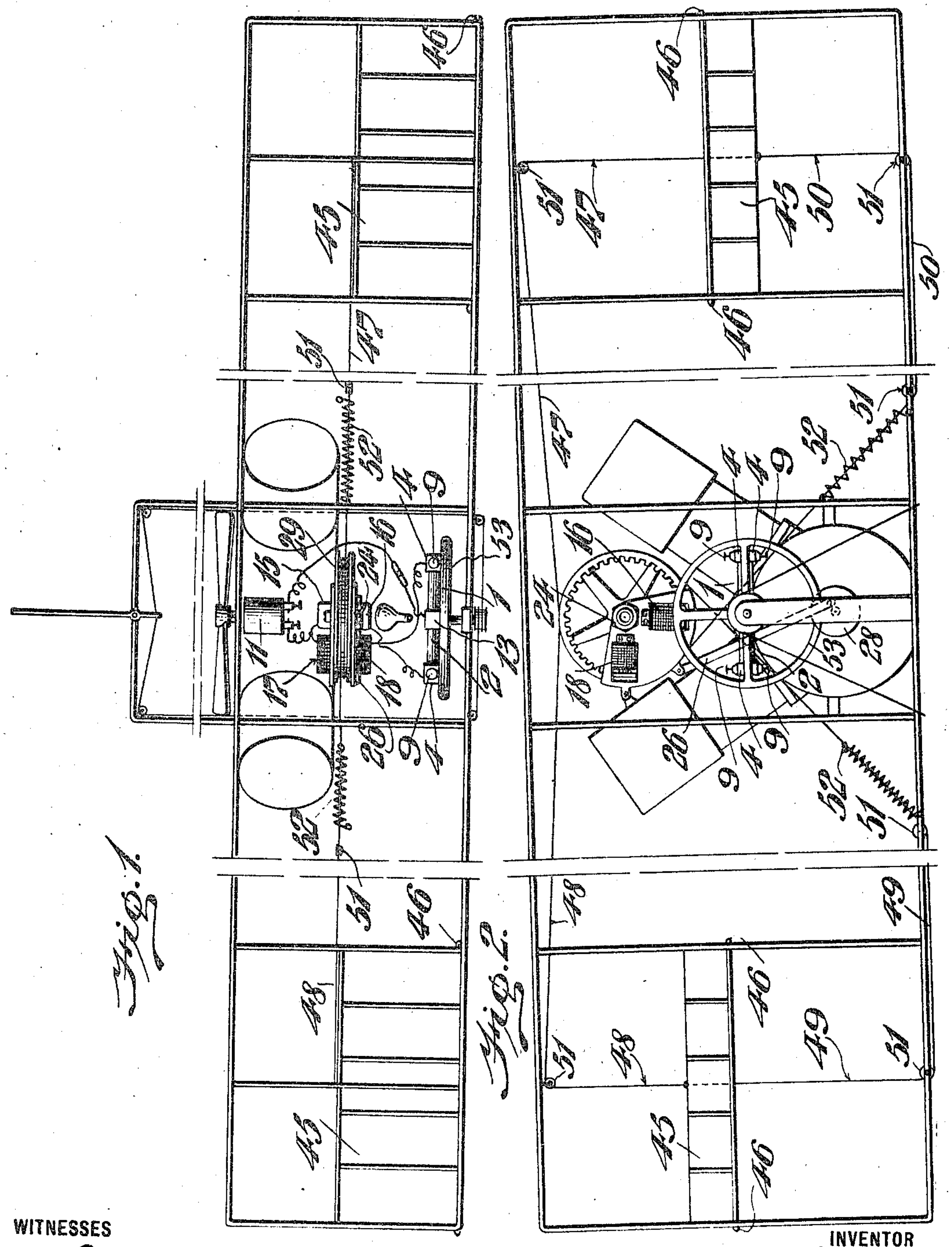
Figures 3, 4:
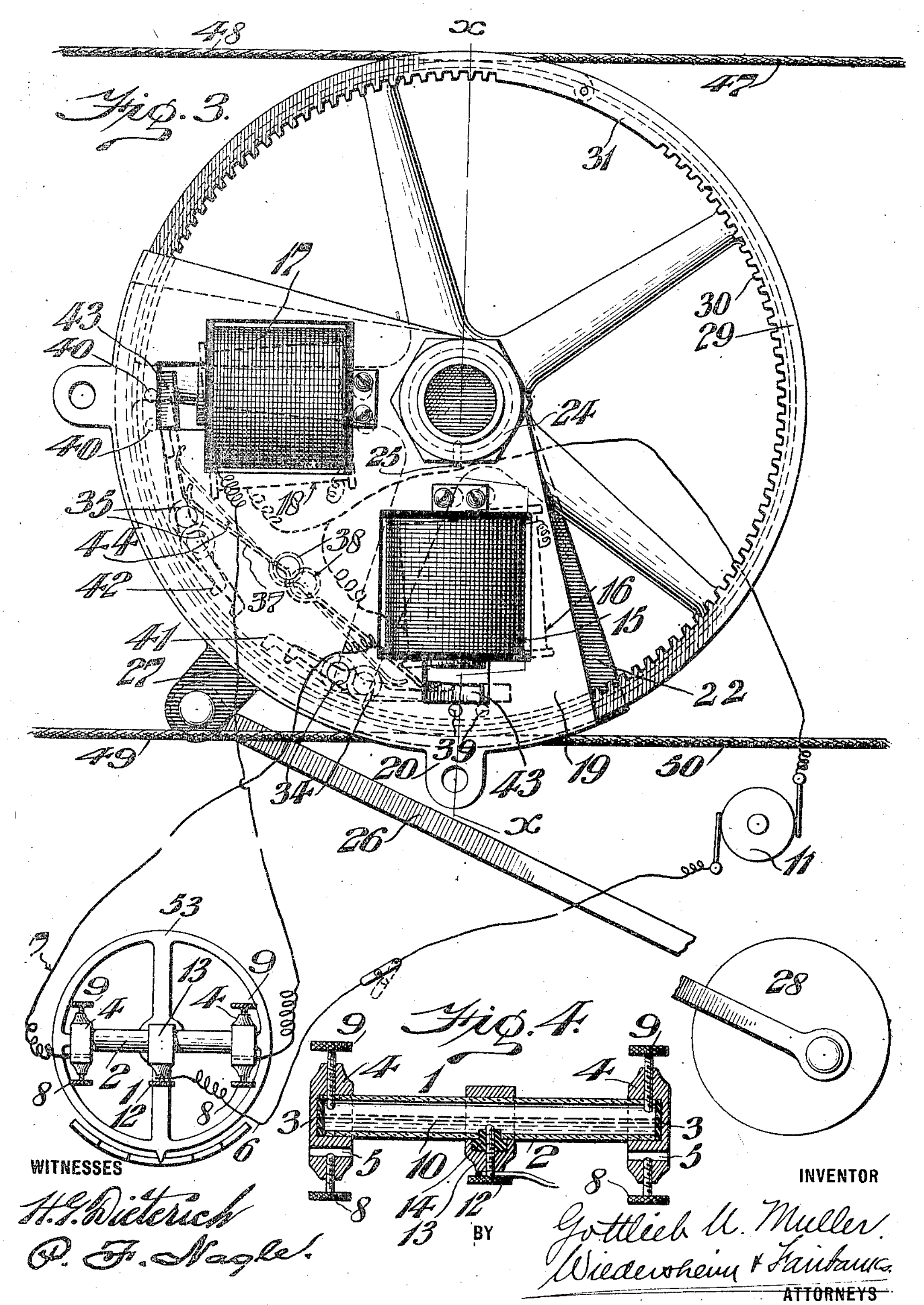
Figures 5, 6, 7:
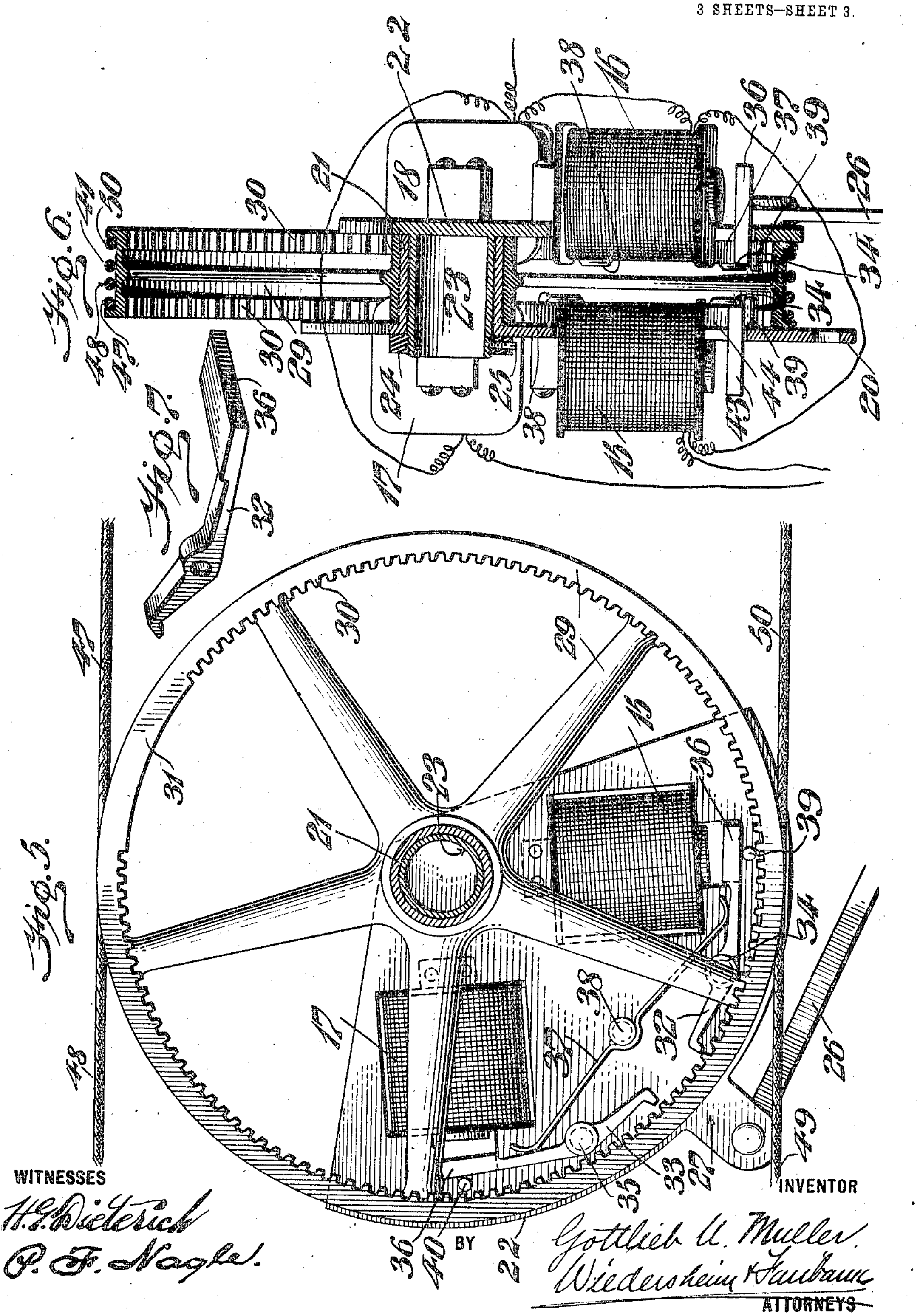

Figure 1 represents a plan of a stabilizing device embodying my invention as applied to an aeroplane, the latter being shown diagrammatically. Fig. 2 represents an end elevation of the same. Fig. 3 represents a side elevation of the operating portion of my novel device. Fig. 4 represents a sectional detail of the automatic actuating mechanism. Fig. 5 represents a view similar to Fig. 3 taken from the opposite side. Fig. 6 represents a section on line *x*—*x* of Fig. 3. Fig. 7 represents a perspective detail of one of the actuating pawls.

Similar numerals of reference indicate corresponding parts in the figures.

Referring to the drawings, 1 designates a level of any suitable type preferably comprising a tube 2 having its ends sealed by suitable insulating material 3 and mounted in posts 4. Each of the posts 4 is provided with an aperture or recess 5 adapted to receive the terminal of a conductor here denoted respectively by the reference numerals 6 and 7 and which is secured or clamped by the binding screws 8. A second binding screw 9 is threaded into each post 4 and passes interiorly of the tube 2 where it terminates a determined distance above the surface of a fluid 10 such as mercury or the like, capable of conducting a current of electricity. Thus, the screws 9 each form the terminal of an independent electric circuit preferably having a common source of supply such as the magneto or battery 11 of which circuits the binding screw 12 forms the other terminal. This binding screw 12, as here shown, is threaded into a supporting block 13 and passes through a suitable bushing 14, serving as a packing, into the tube 2 and contacting at all times with the conductor fluid 10. It will thus be apparent when the tube 2 assumes a position other than the horizontal that the fluid 10 will flow to one end or the other of the same and thus close a circuit in which the automatic actuating mechanism is located. This actuating mechanism embodies in the present instance a plurality of magnets, designated respectively by reference numerals 15, 16, 17 and 18, arranged preferably in pairs, one pair being located in the circuit of which the conductor 6 forms a part, while the other pair is in the circuit of conductor 7. Thus one circuit comprises binding post 9 on one end of tube 2, conductor 6, magneto or battery 11, magnets 15 and 16 in series, binding post 12 and fluid conductor 10, while the other circuit is formed by the other post 9, conductor 7, and magnets 17 and 18, the other parts being common to the two circuits. As here shown, the magnets 15 and 17 are mounted on a plate 19 suitably secured by fastening devices (not shown) passing through the ears 20, to a fixed portion of the machine or engine frame as most convenient, whereby they are permanently held against movement. The plate 19 preferably has a hub 21 formed integral therewith, by means of which other component parts of the actuating mechanism are supported.

22 designates a disk or disk segment having a journal 23 secured thereto and preferably bored out for the sake of lightness; the said journal 23 having a bearing within the hub 21, and being retained by a collar 24, threaded on the end and locked by a set screw 25 or equivalent means. The disk segment 22 is adapted to oscillate with respect to the plate 19, movement being transmitted thereto by means of a connecting rod 26 secured at one end to a suitable part of the said disk, such as the ear 27, and at the other end to an eccentric 28 on the motor shaft or like part adapted to cause reciprocation of the said rod.

29 designates a sheave rotatably mounted on the hub 21 and held against lateral movement by the plate 19 on one side and the disk 22 on the other, while movement is transmitted thereto, in the present instance, by means of a double row of gear teeth 30 cut on the internal circumference of the sheave. The teeth 30, as will be noted, do not extend entirely around the sheave surface and thereby the juxtaposed surfaces 31 are formed, the function of which will presently appear.

32 and 33 designate respectively actuating pawls, pivoted at 34 and 35 to the movable disk segment 22, each of which preferably has formed integral therewith an armature 36 positioned in operative relation to the respective magnets 15 and 17, it of course being understood that these pawls are adapted to coöperate at certain times with the teeth 30 of the sheave 29.

37 designates a spring normally engaging each of the pawls 32 and 33 and retained in position by a lug 38 of the disk 22. This spring, as will be apparent, operates to maintain the pawls out of engagement with the teeth 30 and its action is overcome by the pull of the magnets when energized. The normal position of the pawls 32 and 33 is furthermore controlled by pins 39 and 40 located respectively in the path of movement of each armature 36 and whereby undue outward movement of these members is prevented. In view of the fact that the disk 22 is continually oscillating while the motor is running, it will be seen that should one or the other of the magnets 15 and 17 be energized, the pawl adjacent thereto will be shifted and engage the teeth 30, thereby causing the sheave to rotate. In order to effect such rotation and prevent the sheave from oscillating with the disk 22, a pair of pawls 41 and 42 are pivotally mounted on the fixed plate 19, each being located adjacent one of the magnets 16 and 18 and of course in operative relation thereto. An armature 43 is preferably formed integral with each of these pawls and a spring 44 retains them in normal position out of engagement with the teeth 30. The construction of these pawls and their relation to the magnets 16 and 18 together with their coöperating adjuncts is the same as for the previously described pawls 32 and 33 and it is therefore thought unnecessary to go into a detailed description thereof, the only point to be noted being that they are secured to a fixed part instead of a movable part. The function of these pawls 41 and 42 is to lock the sheave after a movement has been transmitted thereto by one of the movable pawls, thereby effecting a step by step rotation of the sheave. As already explained, the magnet 16 is in the same circuit as the magnet 15 and likewise the magnet 18 in the same circuit with the magnet 17 so that energization of either pair of magnets causes one actuating pawl and one locking pawl to be operated. Thus when the magnets 15 and 16 are energized their armatures 36 and 43 will be attracted and throw the pawls 32 and 41 into operative position to engage respectively the teeth 30 of the sheave 29. The pawl 32 being carried by the movable disk 22 operates in one direction of movement to advance the sheave in that direction, but when moved in the opposite direction the inclined face thereof permits it to be withdrawn from the teeth 30, and as the pawl 41 is held in mesh with the teeth 30 the sheave remains stationary until the next forward movement of the pawl 32. One face of the fixed pawl 41 is so beveled as to permit the sheave to slip past the same during the moving stroke of the pawl 32.

The surfaces 31 having no teeth thereon are provided to limit the rotation of the sheave in either direction, since of course as soon as the same is brought into engaging position with the pawls, the latter will simply reciprocate without causing any further movement of the sheave.

45 designates the usual stabilizing plane pivotally mounted at 46 at each end of the aeroplane and to which I preferably secure a plurality of cables 47, 48, 49 and 50, each of which passes over suitable guide pulleys 51 and around the sheave 29, to which the end of each cable is fixedly secured. As here shown, I preferably provide a spring 52 for each cable 49 and 50, the said springs being connected at one end to the frame of the machine and at the opposite end to the respective cables controlled thereby.

Attention is directed to the location of the level 1, since in the preferred form of my invention, I attach the same directly to the steering wheel 53, whereby operation of the said wheel causes the level to be tilted and thus set the automatic actuating means into operation. The starting of this mechanism varies the position of the stabilizing planes which of course tend to return the machine to a level position and also prevent upsetting, while making a curve. The novel actuating mechanism for the stabilizing planes also makes it possible to vary the sweep of the machine in making a curve and the degree of inclination varies according as the curve has a short or a long radius. It will of course be understood that the steering wheel 53 is the usual wheel for operating the rudder of the machine and by which the direction of the aeroplane is changed at the will of the operator.

In the operation of the device no action takes place so long as the aeroplane remains level, since the tube 2 is then likewise level and both magnet circuits are broken, though of course the disk 22 is oscillating with the motor. As soon, however, as the machine tilts one way or the other, the conductor fluid 10 flows to an end of the tube 2 and thereby closes one of the circuits. This action energizes a pair of the actuating magnets which attract the armature of the pawl mechanism and the sheave is in consequence caused to begin a step by step rotation. The rotation of the sheave causes the stabilizing planes to be shifted to return the machine to its level position thereby again breaking the circuit, whereupon the cable springs return the parts to their normal operative positions.

Aeroplanes, as at present constructed, carry a stabilizing device to hold the flying machine horizontal when flying straight and to incline the machine when making a sweep, but this has to be done manually and is at times confusing to the operator. By my construction it is possible to do all of this automatically. I have shown, in the present instance, a level device mounted on the steering wheel 53 in a horizontal position, preferably on a line with the planes, so that by turning the steering wheel to one side or the other to make a sweep, the level will travel around with the wheel the same number of degrees, and be on an angle to the planes. As the level tends to bring itself horizontal it will swing the planes around until the horizontal position is reached and the planes and the level come into parallel relation. In practice I prefer to connect the automatic stabilizing control so that the stabilizing planes may be operative at the will of the operator if desired. A suitable switch in the magnet circuit makes it possible to cut out the automatic control when desired and allow the planes to be controlled by the customary manual means.

It will now be apparent that I have devised a complete, unitary structure automatic in its operation, simple in construction and efficient as a means to relieve the operator of an aeroplane from the burden of manually operating the balancing planes whenever the machine is tilted or thrown out of level position.

It will now be apparent that I have devised a novel and useful construction of an automatic stabilizing apparatus for aeroplanes which embodies the features of advantage enumerated as desirable in the statement of the invention and the above description and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In an areoplane, stabilizing planes therefor, mechanism for varying the position of the stabilizing planes, a pair of magnets movably mounted adjacent said mechanism, a second pair of magnets, fixedly mounted adjacent said mechanism, independent means controlled by each magnet for engaging said varying mechanism for actuating the same, means to oscillate said movable magnets, and means actuated by the inclination of said aeroplanes for energizing simultaneously one movable magnet and one fixed magnet.

2. In an aeroplane, stabilizing planes therefor, cables secured to said planes, a sheave to which said cables are secured, gear teeth on said sheave, a magnet movably mounted adjacent said sheave, a pawl controlled by said magnet and adapted to engage said teeth, a second magnet fixedly mounted adjacent said sheave, a pawl controlled thereby and adapted to engage said teeth, means to oscillate said movable magnet and its pawl, and means actuated by the inclination of said aeroplane for energizing said magnets.

3. In an aeroplane, stabilizing planes therefor, cables secured to said planes, a sheave to which said cables are secured, gear teeth on said sheave, a pair of magnets movably mounted adjacent said sheave, a pawl controlled by each magnet and adapted to engage said teeth, a second pair of magnets fixedly mounted adjacent said sheave, a pawl controlled by each magnet and adapted to engage said teeth, means to oscillate said movable magnets and the pawls controlled thereby, and means actuated by the inclination of said aeroplane for energizing simultaneously one movable magnet and one fixed magnet.

4. In an aeroplane, stabilizing planes therefor, cables secured to said planes, a sheave to which said cables are secured, a plate fixedly secured adjacent said sheave, pawls carried by said plate, gear teeth on said sheave adapted to be engaged by said pawls, a disk movably mounted adjacent said sheave, pawls carried by said disks adapted to engage said teeth, means to actuate said pawls in pairs, and means governed by the inclination of said aeroplane for automatically actuating said means.

GOTTLIEB U. MULLER.

Witnesses:

ROBERT M. BARR,
C. D. MCVAY.

Copies of this patent may be obtained for five cents each, by addressing the "Commissioner of Patents, Washington, D. C."